United States Patent
Serizawa

(10) Patent No.: US 7,143,262 B2
(45) Date of Patent: Nov. 28, 2006

(54) METHOD, APPARATUS AND PROGRAM FOR ALLOCATING STORAGE AREA TO VIRTUAL VOLUME

(75) Inventor: Kazuyoshi Serizawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 462 days.

(21) Appl. No.: 10/607,027

(22) Filed: Jun. 27, 2003

(65) Prior Publication Data

US 2004/0098537 A1    May 20, 2004

(30) Foreign Application Priority Data

Nov. 14, 2002    (JP)    ............................. 2002-330323

(51) Int. Cl.
*G06F 12/00* (2006.01)
(52) U.S. Cl. .......................................... 711/171; 711/6
(58) Field of Classification Search ........ 711/170–173, 711/112; 707/205; 709/224
See application file for complete search history.

(56) References Cited

U.S. PATENT DOCUMENTS

| | | | |
|---|---|---|---|
| 4,758,946 A * | 7/1988 | Shar et al. .................. 711/206 |
| 5,390,315 A * | 2/1995 | Blandy et al. .............. 711/112 |
| 5,784,699 A * | 7/1998 | McMahon et al. .......... 711/171 |
| 5,890,169 A * | 3/1999 | Wong et al. ................ 707/206 |
| 5,897,661 A * | 4/1999 | Baranovsky et al. ........ 711/170 |
| 6,131,150 A * | 10/2000 | DeTreville .................. 711/173 |
| 6,216,202 B1 * | 4/2001 | D'Errico ..................... 711/112 |
| 6,378,039 B1 * | 4/2002 | Obara et al. ................ 711/114 |
| 6,836,819 B1 * | 12/2004 | Kano et al. |
| 6,851,082 B1 * | 2/2005 | Corbett ....................... 714/770 |
| 6,857,059 B1 * | 2/2005 | Karpoff et al. |
| 2001/0018731 A1 * | 8/2001 | Fujii et al. ................... 711/170 |
| 2001/0047482 A1 * | 11/2001 | Harris et al. ................ 713/200 |
| 2002/0026558 A1 * | 2/2002 | Reuter et al. |
| 2003/0131182 A1 * | 7/2003 | Kumar et al. ................. 711/5 |
| 2003/0191904 A1 * | 10/2003 | Iwami et al. ............... 711/147 |
| 2003/0229698 A1 * | 12/2003 | Furuhashi et al. .......... 709/226 |
| 2005/0235288 A1 * | 10/2005 | Yamakabe et al. .......... 718/100 |

FOREIGN PATENT DOCUMENTS

| | | |
|---|---|---|
| JP | 2000-339098 | 12/2000 |
| JP | 2001-350707 | 12/2001 |

OTHER PUBLICATIONS

U.S. Appl. No. 60/261,140, filed Jan. 11, 2001, Karpoff.*
U.S. Appl. No. 60/209,326, filed Jun. 2, 2000, Bean et al.*
U.S. Appl. No. 60/209,109, filed Jun. 2, 2000, Wrenn et al.*

* cited by examiner

*Primary Examiner*—Reginald G. Bragdon
*Assistant Examiner*—Thanh D Vo
(74) *Attorney, Agent, or Firm*—Mattingly, Stanger, Malur & Brundidge, P.C.

(57) ABSTRACT

In a system comprising host computers and storage devices, storage regions maintained by storage devices are provided as virtualized volumes to the host computers by a virtualization function. In the case of allocating a vacant storage region from storage regions of a storage device to a virtualized volume, the virtualization function repeats to acquire and allocate a storage region from the vacant storage region until a remaining size within a required size becomes smaller than a maximum region size and, below the maximum region size, acquires and allocates a storage region, whose size is the smallest power of two not smaller than the remaining size, from the vacant storage region. If the vacant storage region includes a plurality of continuous vacant regions, the virtualization function selects the largest continuous vacant region for allocation.

16 Claims, 10 Drawing Sheets

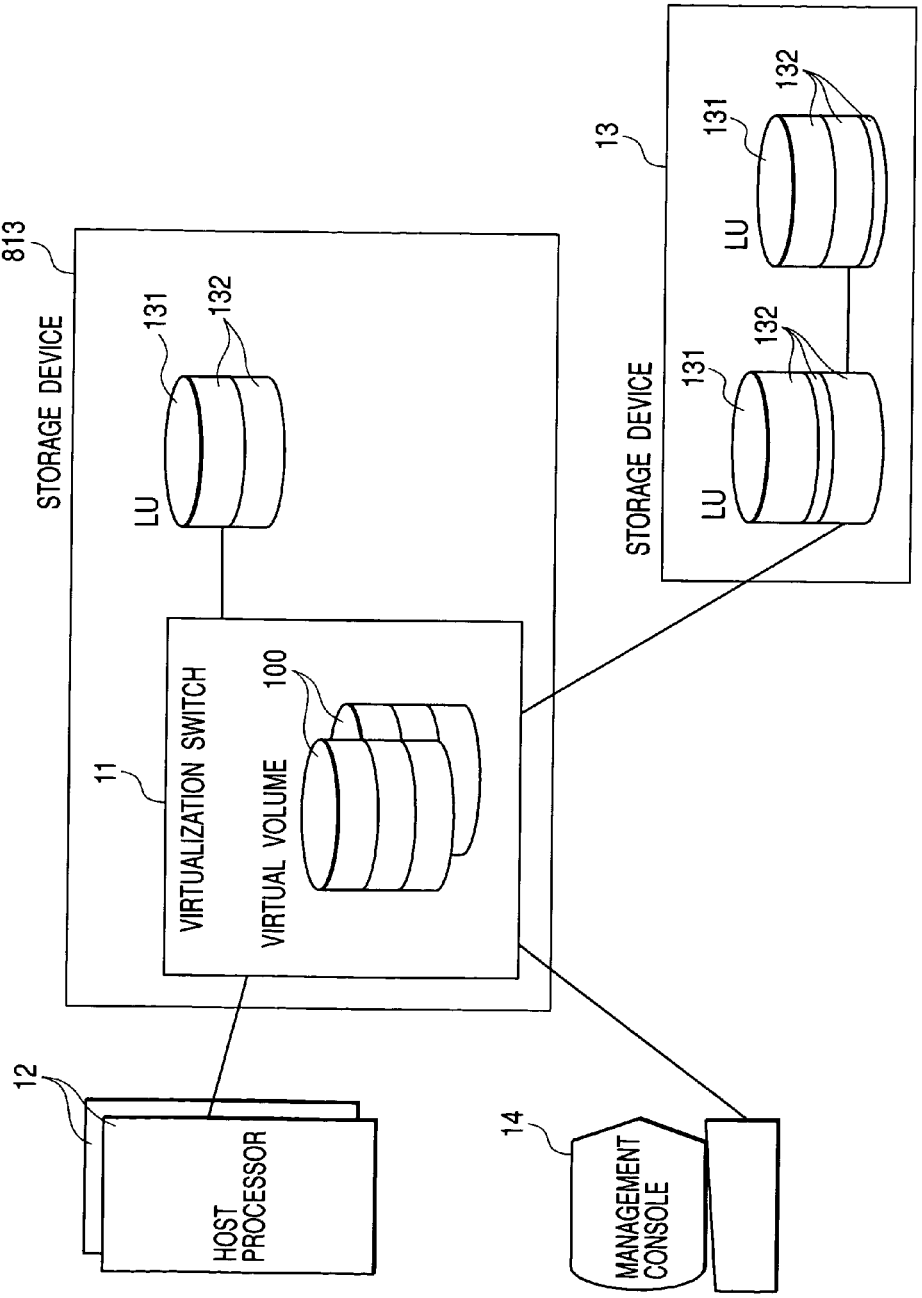

METHOD, APPARATUS AND PROGRAM FOR ALLOCATING STORAGE AREA TO VIRTUAL VOLUME

FIELD OF THE INVENTION

The present invention relates to a technique for allocating a real storage area to a virtual volume in a storage virtualization system.

BACKGROUND OF THE INVENTION

Techniques for virtualizing a storage device and providing it to a host computer connected with the storage device via a network are described in such documents as Japanese Patent Laid-open No. 2000-339098 (Patent Document 1) and U.S. Pat. No. 6,216,202 Specification (Patent Document 2).

Also in Japanese Patent Laid-open No. 2001-350707 (Patent Document 3), a technique is disclosed which compares evaluated performance values of each storage or each storage region with the required performance values specified by the system administrator and, based on the result, allocates storage regions to a host computer.

Further U.S. Pat. No. 6,131,150 (Patent Document 4) discloses a technique called buddy algorithm (hereinafter abbreviated as B.A.). B.A. is a method for preventing fragmentation of vacant regions in a memory. By managing the memory in such a manner that the allocated memory size is always a power of two, fragmentation can be prevented since released memory regions can be re-integrated with adjacent vacant regions.

SUMMARY OF THE INVENTION

If the storage region in a real storage device (hereinafter denoted as a real region) is allocated and released frequently in the process of virtualization of storage, vacant regions in the storage device are fragmented. As a result, the number of real regions to be allocated to each virtual volume increases. These increased real regions may raise the management cost, deteriorate the transmission performance and lower the reliability. In the configuration of a virtual volume, prevention of fragmentation is not taken into consideration in Patent Documents 1, 2 and 3. A first problem which the present invention intends to solve is to prevent fragmentation.

Meanwhile, the B.A. disclosed in Patent Document 4 causes deteriorated space efficiency as the allocated region size increases. This is because the difference between the required region size and the smallest power of two exceeding the required region size is allocated uselessly. Since relatively large real regions are sometimes allocated, this excessive allocation may deteriorate space efficiency substantially. A second problem which the present invention intends to solve is to prevent the allocation of real regions from deteriorating the space efficiency of the storage.

In addition, real regions are allocated more frequently than real regions are released in a storage virtualization system. This is because while a real region is allocated each time the capacity of a virtual volume is increased, release is done only when the whole of a virtual volume is released. Therefore, to enlarge and increase continuous vacant areas, real regions to be allocated must be selected so as to raise the possibility that releasing regions will cause continuous vacant areas. A third problem which the present invention intends to solve is to select real regions which are more likely to cause continuous vacant areas when released.

In addition, if a plurality of real regions equivalent with each other in terms of performance and reliability are available for allocation to a virtual volume, it is preferable to disperse the load to a plurality of storage devices so that the load does not concentrate on a specific storage device. Also when a created virtual volume is given an additional real region later, it is preferable to select a storage device so as to raise the dispersion of the load. A fourth problem which the present invention intends to solve is to select real regions so as to raise the dispersion of the load.

It is an object of the present invention to provide a technique for allocating a storage area to a virtual volume to solve at least one of the aforementioned problems.

According to the present invention, there is provided a storage allocation technique which solves at least the second problem mentioned above. This technique is characterized in that to allocate vacant storage to a virtual volume from at least one storage device, a storage region is acquired for allocation from a vacant storage region until the remaining size, the required size minus the allocated size, becomes smaller than a specified maximum region size and then a storage region, whose size is the smallest power of two not smaller than the remaining size, is acquired from the vacant storage region for allocation. Further, according to the present invention, there are provided techniques which respectively solve the aforementioned first, third and fourth problems.

BRIEF DESCRIPTION OF THE DRAWINGS

Other objects and advantages of the invention will become apparent from the following description of embodiments with reference to the accompanying drawings in which:

FIG. 8 is a diagram showing the system configuration of a third embodiment;

DETAILED DESCRIPTION OF THE INVENTION

The following describes embodiments of the present invention with reference to the drawings.

Figure 1:
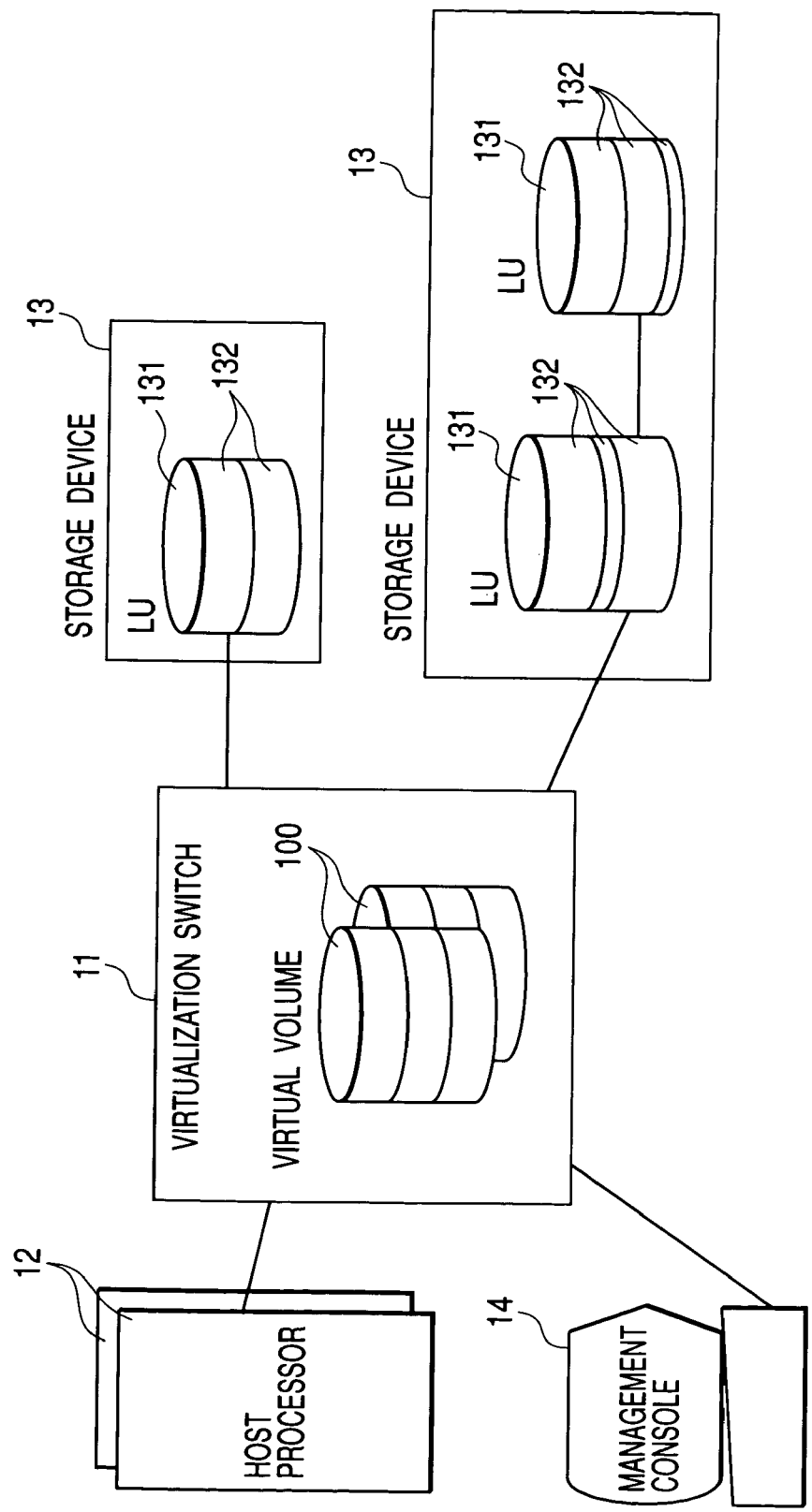
FIG. 1 is a diagram showing the system configuration of an embodiment.

FIG. 1 shows the general configuration of a system in accordance with the present invention. The system comprises at least one host processor 12, at least one storage device 13, a virtualization switch 11 and a management console 14. The virtualization switch 11 is connected with the other apparatus via transmission lines and can communicate with the other apparatus. The host processor 12, a computer, initiates data read from and data write to each storage device.

Each storage device 13 is itself a storage subsystem provided with a storage controller and has at least one LU (Logical Unit) 131. Each LU 131, comprising at least one real region 132 which resides on the storage medium in the storage device 13, provides a logically independent single storage device to the host computer 12 and other external apparatus. Although each LU 131 is a logical unit, it is usually associated with a physical apparatus such as a RAID group. Each real region 132 is a logical region occupying a certain storage section in the LU 131 and has consecutive addresses. Any location in the real region 132 is accessed by the address of the LU 132 and the address of the location in the real region 132.

The virtualization switch 11 is connected with each host processor 12 and each storage device 13 via transmission lines such as fibre channels. Interfering between a host processor 12 and a storage device 13, the virtualization switch 11 provides a function to switch the communication line on the side of the host processor 12 to the communication line on the side of the storage device 13. In addition, the virtualization switch 11 provides virtual volumes 100 to the host processor 12. Each virtual volume 100 is a virtualized storage device constructed by gathering at least one real region 132 belonging to at least one LU 131. The whole storage region of the virtual volume 100 is given consecutive addresses. The host processor 12 can read and write data from and to any location in the virtual volume 100 by specifying the address of the location and the address of the virtual volume 100 instead of directly accessing the LU 131 of the storage device 13.

The management console 14 is an input/output apparatus used by the system administrator to create a new virtual volume 100 and alter the configuration of the storage region of a virtual volume 100. The console 14 is provided with a display and an input device.

Figure 2:
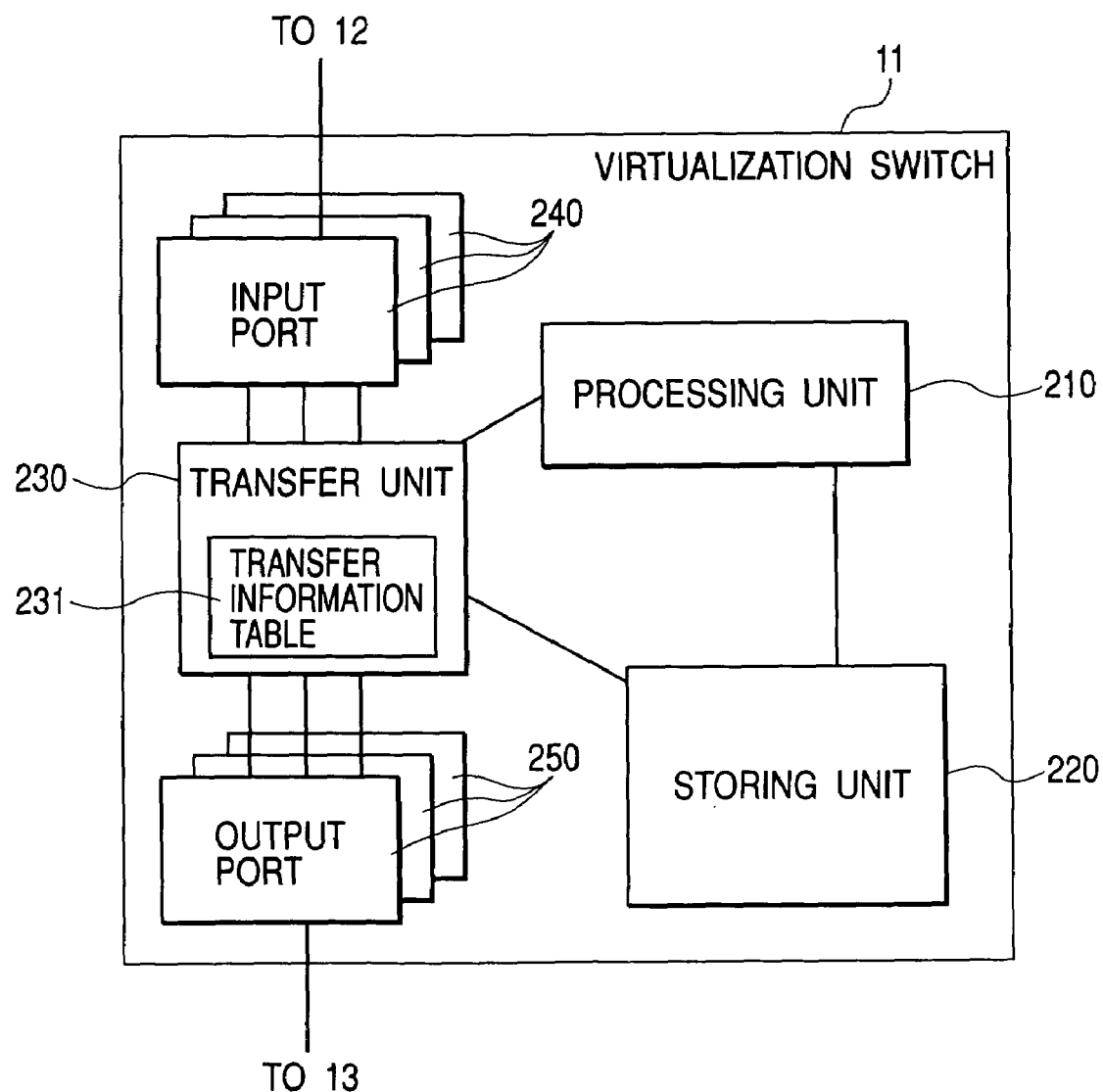
FIG. 2 is a diagram showing the internal configuration of a virtualization switch 11 in the embodiment.

FIG. 2 shows the internal configuration of the virtualization switch 11. The virtualization switch 11 comprises input port(s) 240, output port(s) 250, a transfer unit 230, a processing unit 210 and a storing unit 220. Each input port 240 is a port by which the virtualization unit 11 communicates with a host processor 12. Each output port 250 is a port by which the virtualization switch 11 communicates with a storage device 13. The transfer unit 230 holds a transfer information table 231 in its memory. The transfer information table 231 contains associativity information indicating which host processor 12 can respectively communicate with each input port 240 and which storage device 13 can respectively communicate with each output port 250. When an input port 240 receives an input/output request from a host processor 12, the transfer unit 230 refers to the transfer information table 231 and transfers the input/output request to an output port 250 which is connected to the request-destined storage device 13. In addition, when an output port 250 receives response information and data from a storage device 13, the transfer unit 230 transfers them to an input port 240 which is connected to the pertinent host processor 12. When the input/output request received from a host processor 12 is destined to a virtual volume 100, however, the process of an access translation block 212 interferes as described below to determine to which storage device 13 the input/output request is to be sent. In the processing unit 210 provided with a processor and a memory, the processor implements the functions of the virtualization unit 11 as described below in detail by executing programs stored in the memory. The storing unit 220 stores management tables and data that the processing unit 210 refers to.

Figure 3:
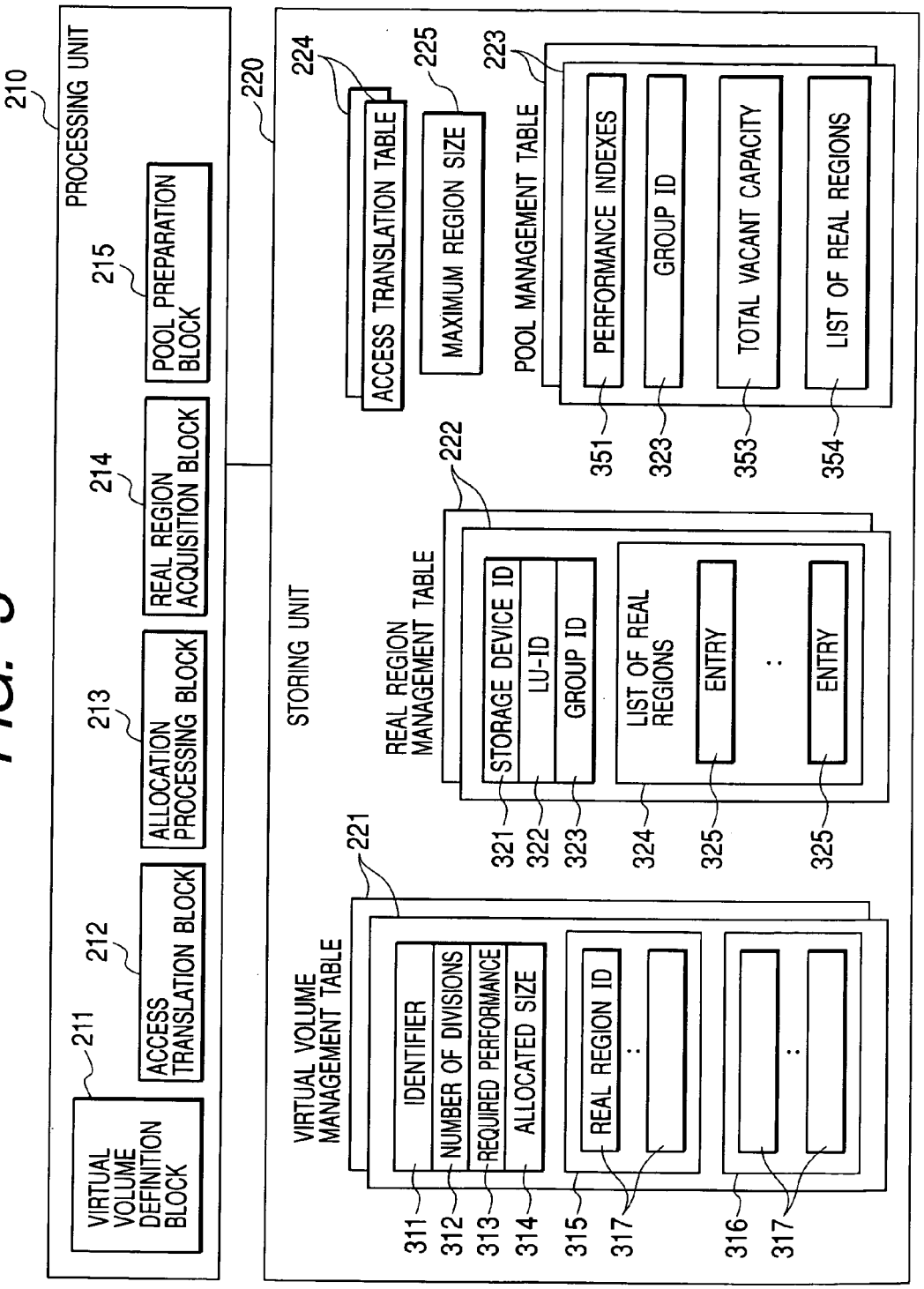
FIG. 3 is a diagram showing the internal configuration of a processing unit 210 and that of a storing unit 220 in the embodiment.

FIG. 3 shows the internal configuration of the processing unit 210 and that of the storing unit 220. The processing unit stores a virtual volume definition block 211, an access translation block 212, an allocation processing block 213, a real region acquisition block 214 and a pool preparation block 215 in its memory. Each block is a program which is executed by the processor. The storing unit 220 stores virtual volume management table(s) 221, real region management table(s) 222, pool management table(s) 223, access translation table(s) 224 and a maximum region size 225.

An access translation table 224 is provided for each virtual volume 100 and maintains information on associativity between the address of each storage region on the virtual volume 100 and the addresses of the corresponding real region 132 and the LU 131 where the real region 132 exists in the storage device 13. The access translation table 224 is updated when the storage configuration of the relevant virtual volume 100 is altered.

Each input/output request for a virtual volume 100, received from a host processor 12, is translated by the access translation block 212 to an input/output request for the corresponding LU 131 in the corresponding storage device 13. This translation is done by referring to the access translation table 224 prepared for the virtual volume 100. Note that it is possible to improve the translation performance if a copy of the access translation table 224 and that of the access translation block 212 are prepared for each input port 240.

A real region management table 222 is provided for each LU 131 and used to manage the real regions 132 contained in the LU 131. Each real region management table 222 stores a storage device ID 321, a LU-ID 322, a group ID 323 and a list of real regions 324. The storage device ID 321 is the identifier of the storage device 13 which has the pertinent LU. The LU-ID 322 is the identifier of the pertinent LU. The group ID 323 is given as a result of grouping a plurality of LUs 131 of the storage devices 13 by performance and is the identifier of the group to which the pertinent LU belongs.

Here, a group means one unit of storage when the access load is distributed to a plurality of storage devices 13 or LUs 131. For example, if the load can be distributed to a respective LU 131 or a real region 132 in a storage device 13, either each LU 131 or each load-distributable real region 132 may be defined as a different group. To the contrary, if the storage device 13 has not the capability of dispersing the load therein, all LUs 131 contained in the storage device 13 belong to the same group. That is, all storage devices or storage regions which belong to the same group form one unit of storage which cannot be divided further in the distribution of the load. If a virtual volume requires the load to be dispersed, a plurality of groups is allocated to the single virtual volume.

The list of real regions 324 consists of at least one entry 325. Each entry 325 is provided for a real region 132 and consists of the following items; region ID, size, virtual volume identifier and degree of releasability. The region ID is an identifier to identify the pertinent real region 132. The size is a size of the pertinent real region 132. The virtual volume identifier is an identifier of the virtual volume to which the pertinent real region 132 is allocated. The degree of releasability is information indicating how likely or preferredly the real region is to be released after the real region is allocated to a virtual volume 100. If the possibility that data on the real region 132 may be moved to another real region 132 is high, it can be said that the real region 132 has a high degree of releasability. To the contrary, if the moving possibility is low, the real region 132 is considered to have a low degree of releasability. The entries 325 in the list of real regions 324 are arranged in the address order of their real regions 132. The real regions 132 in a group have consecutive addresses and their entries 325 cover all real regions of the group. Entries have no virtual volume identifiers if the real regions 132 are vacant.

A virtual volume management table 221 is provided for each virtual volume 100 and stores an identifier 311, the number of divisions 312, required performance 313, an allocated size 314, a list of allocated real regions 315 and a list of temporally allocated real regions 316. The identifier 311 is an identifier of the pertinent virtual volume 100. The number of divisions 312 is the number of divisions created as a result of dividing the pertinent virtual volume 100 in order to disperse the access load to respective divisions. The required performance 313 is numerical values indicating the performance and reliability required of the pertinent virtual volume 100 by the system administrator. The performance value is a data transfer rate while the reliability value is a rank of reliability. The allocated size 314 is the size of real storage to be allocated to the pertinent virtual volume 100 by the allocation process. Patent Document 3 includes a description of the performance indexes. The list of allocated real regions 315 lists the real region IDs 317 of the real regions 132 which have been allocated to the pertinent virtual volume 100. The list of temporally allocated real regions 316 lists the real region IDs 317 of the real regions 132 which have been reserved for allocation to the pertinent virtual volume 100.

A pool management table 223 is provided for each aforementioned group and stores performance indexes 351, a group ID 323, total vacant capacity 353 and a list of real regions 354. The performance indexes 351 are numerical values indicating the performance and reliability of the real regions 132 forming the pertinent pool. The group ID 323 is an identifier of the group associated with the pertinent pool. The total vacant capacity 353 is the total capacity of the vacant regions of the pertinent pool. The list of real regions 354 lists identifiers (real region IDs) of vacant real regions 132 which constitute the pertinent pool.

The maximum region size 225 stores the maximum size of real storage allowed to be allocated wastefully. The maximum region size 225 is set as an integer power of two. The maximum region size 225 is data set by the system administrator.

When a request to create a virtual volume 100 or allocate real storage to a virtual volume is issued from the system administrator via the management console 14, the virtual volume definition block 211 creates a new virtual volume management table 221 or updates the pertinent virtual volume management table 221 according to the received allocated size 314, number of divisions 312 and required performance 313. This updating of the virtual volume management table 221 is done in the case of increasing the storage capacity of a virtual volume 100. Then, the virtual volume definition block 211 requests the pool preparation block 215 to prepare pools. The pool preparation block 215 searches all real region management tables 222 for vacant real regions 132 and, for each group, creates a group ID 323, stores the identifiers of vacant real regions 132 in the list of real regions 354 and sets the total vacant capacity 353 and the pre-defined performance indexes 351. After all pool management tables 223 are prepared, the virtual volume definition block 211 passes these pools and the created or updated virtual volume management table 221 to the allocation processing block 213 and requests the block to perform allocation processing of the real region 132.

Figure 4:
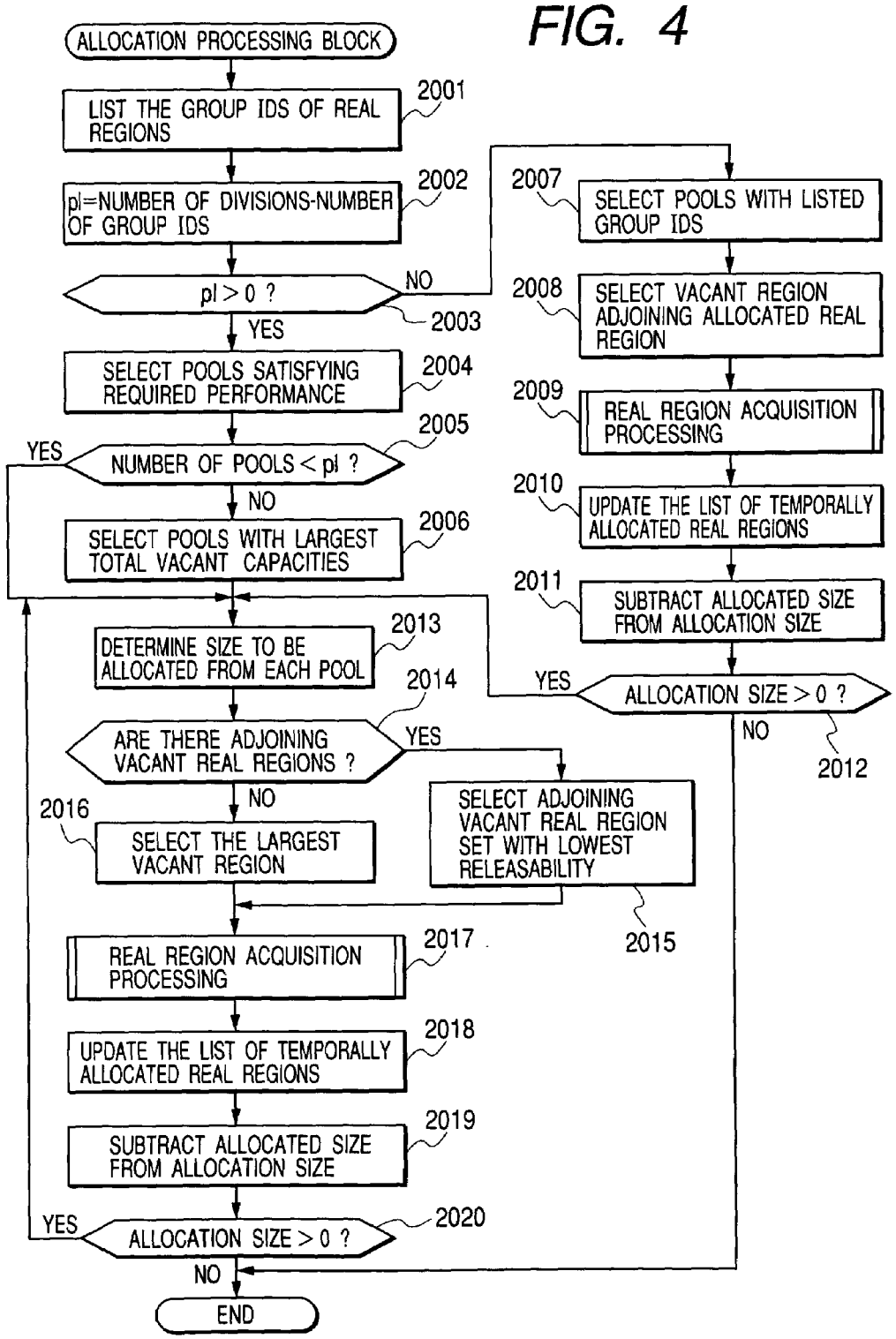
FIG. 4 is a flowchart illustrating the flows of processing by an allocation processing block 213 in the embodiment.

FIG. 4 is a flowchart illustrating the flows of processing by the allocation processing block 213. First, with reference to the list of allocated real regions 315 of the pertinent virtual volume management table 221 and the real region management tables 222 of allocated real regions, the allocation processing block 213 lists the group IDs 323 of the real regions 132 allocated to the pertinent virtual volume 100 (Step 2001). When a new virtual volume 100 is to be created, nothing is done since there is no group ID which should be listed. Then, the allocation processing block 213 subtracts the number of the listed groups (0 when a new virtual volume 100 is created) from the number of divisions 312 and assigns the result to a variable pl (Step 2002). The variable pl is the number of pools which are to be newly searched.

If the variable pl is larger than 0 (Step 2003YES), the allocation processing block 213 executes Steps 2004 through 2006 to select pools from which real regions 132 are to be allocated. Specifically, the allocation processing block 213 compares the required performance 313 with the performance indexes 351 in each pool management table 223 having a group ID 323 not listed in Step 2001 and selects pools which satisfy the required performance 313 (Step 2004). In Patent Document 3, a method for comparing required specifications with performance indexes is described. Then, the number of selected pools is compared with the variable pl (Step 2005). If the number of pools is smaller than pl (Step 2005YES), the allocation processing block 213 goes to Step 2013 because of a lack of pools. If the number of pools is not smaller than pl (Step 2005NO), the allocation processing block 213 selects pl pools in the decreasing order of the total vacant capacity 353 (Step 2006) and goes to Step 2013. If the sum of the total vacant capacities of the pl pools is smaller than the allocated size 314, however, the allocation processing block 213 continues to select another pool in the decreasing order of the total vacant capacity 353 until the sum reaches the allocated size 314.

Meanwhile, if pl is not larger than 0 (Step 2003NO) the allocation processing block 213 executes Steps 2007 through 2012. First, the allocation processing block 213 selects pool management tables 323 or pools which have the group IDs 323 listed at Step 2001 (Step 2007). Then, the allocation processing block 213 searches the list of real regions 324 in the real region management tables 222, which have the listed group IDs 323, and selects a continuous vacant region set adjoining a real region 132 which has been allocated to the pertinent virtual volume 100 (Step 2008). If there are more than one vacant regions to be allocated, the allocation processing block 213 appropriately divides an allocation size specified by the allocated size 314 in order to allow them to be selected for allocation. Then, the allocation processing block 213 calls the real region acquisition block 214. According to the allocation size and selected continuous vacant region set specified by the allocation processing block 213, the real region acquisition block 214 performs real region acquisition processing (Step 2009). Then, the list of temporally allocated real regions 316 in the pertinent virtual volume management table 221 is updated with the acquired regions added (Step 2010). Then, the allocation processing block 213 subtracts from the allocation size the size of the regions allocated at Step 2009 (Step 2011). If the allocation size becomes not larger than 0 (Step 2012NO), processing is terminated.

Then, the allocation processing block 213 determines allocation sizes assigned to the respective pools selected in the previous step (Step 2013). Each assignment may or may not be the same size. Then, for each pool, the allocation processing block 213 refers to the real region management table 222 and judges whether the pool has a continuous vacant region set exceeding the size assigned in Step 2013 (Step 2014). If such an area is not present, the largest continuous vacant region set is selected (Step 2016). If such an area is found, the allocation processing block 213 selects a continuous vacant region set adjoining a real region having the lowest releasability (a real region which is least likely to be released) (Step 2015). This is because if a real region 132 adjoining a vacant area is less likely to be released than the other adjoining real region 132, allocating an area adjoining the former real region results in an enlarged continuous vacant area when the later is released.

Then, the allocation processing block 213 calls the real region acquisition block 214. The real region acquisition block 214 performs real region acquisition processing according to the real region sets selected at Step 2015 or 2016 and the allocation size, which are specified by the allocation processing block 213 (Step 2017). The list of temporally allocated real regions 316 in the pertinent virtual volume management table 221 is updated by adding the acquired regions therein (Step 2018). Then, the allocation processing block 213 subtracts from the allocation size the size of the regions allocated at Step 2017 (Step 2019). If the allocation size is larger than 0 (Step 2020YES), processing goes back to Step 2013. If the allocation size is not larger than 0 (Step 2020NO), processing is terminated.

According to the aforementioned procedure of processing by the allocation processing block 213, the allocated size 314, the number of divisions 312 and the required performance 313 specified by the system administrator as a part of an allocation request for a virtual volume 100 are prioritized in such a manner that satisfying the allocated size 314 is given the highest priority, satisfying the required performance 313 by Steps 2004 and 2005 is given the second highest priority and satisfying the number of divisions 312 is given the lowest priority. In addition, according to the aforementioned procedure of processing by the allocation processing block 213, real regions are allocated in such a manner that fragmentation is minimized due to the processing of Step 2015.

Figure 5:
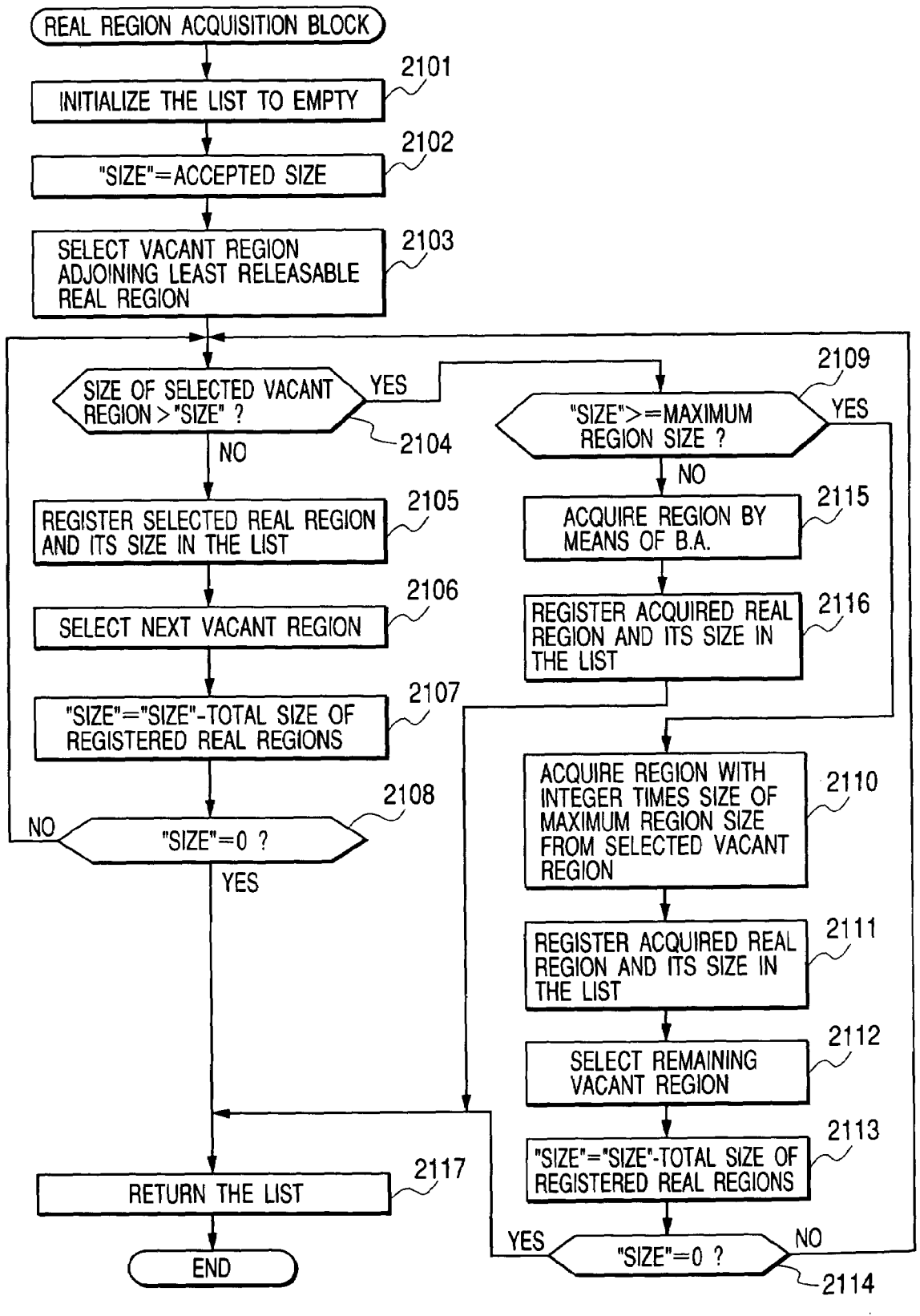
FIG. 5 is a flowchart illustrating the flows of processing by a real region acquisition block 214 in the embodiment.

FIG. 5 is a flowchart illustrating the flows of processing by the real region acquisition block 214 in the first embodiment. First, the real region acquisition block 214 initializes a list to empty (Step 2101) and stores the accepted size in a variable "size" (Step 2102). The list is a liaison region prepared in the memory and used to notify the allocation processing block 213 of allocated real regions 132. Then, the real region acquisition block 214 judges the releasabilities of the upper and lower allocated real regions 132 adjoining the specified continuous vacant region set and selects a vacant region adjoining the real region 132 which is less likely to be released (Step 2103).

Then, the real region acquisition block 214 cuts out real storage from one or more real regions 132 including the vacant region selected in Step 2103 by repeating Steps 2104 through 2116 as necessary. First, if the size of the selected vacant region 132 is smaller than "size" (Step 2104NO), the real region acquisition block 214 acquires the whole of the selected vacant region 132 by registering the real region 132 with its size to the list (Step 2105). In this case, acquisition means to set the identifier of the virtual volume to the pertinent entry 325 of the real region management table 222. Meanwhile, in the following, acquisition means to divide an entry 325 in a real region management table 222 into an entry 325 of an allocated region and an entry 325 of a vacant region and set region IDs, sizes and virtual volume 100 identifiers as appropriate to the entries. Then, similar to the processing of Step 2103, the real region acquisition block 214 selects the next vacant region from the specified continuous vacant region set (Step 2106). Then, the size of the real region 132 registered in Step 2105 is subtracted from "size" (Step 2107). If "size" becomes 0 (Step 2108YES), processing goes to Step 2117. Otherwise, processing goes back to Step 2104.

If the size of the selected vacant region is larger than "size" (Step 2104YES), the real region acquisition block 214 executes Steps 2109 through 2116 which divide the selected vacant region and acquires a resulting real region 132 for allocation. First, the real region acquisition block 214 judges whether "size" is not smaller than the maximum region size 225 (Step 2109). If "size" is not smaller than the maximum region size 225 (Step 2109YES), the real region acquisition block 214 cuts out the largest region, which has integer times the size of the maximum region size 225 and is not larger than "size", from the selected vacant region (Step 2110). Then, the real region acquisition block 214 registers the cut out real region 132 with its size to the list (Step 2111). Then, similar to the processing of Step 2103 where a vacant region is selected from a continuous vacant region set, the real region acquisition block 214 selects a remaining vacant region (Step 2112). Then the size of the real regions 132 registered in Step 2111 is subtracted from "size" (2113). Since the remaining vacant region is selected in Step 2112, the vacant region acquired in Step 2110 and the vacant region to be acquired in Step 2105, 2115 or 2110 will form a continuous vacant area. If "size" becomes 0 (Step 2114YES), processing goes to Step 2117. Otherwise, processing goes back to Step 2104.

If "size" is smaller than the maximum region size 225 (Step 2019NO), the real region acquisition block 214 cuts out a region according to B.A. (Step 2115). That is, "size" is raised to the smallest power of two which is equal to or greater than "size". An area of this raised size is cut out from the selected vacant region while the remaining area, if any, is left as a vacant region. Then, the real region acquisition block 214 registers the cut out real region 132 with its size to the list (Step 2116). Finally, the real region acquisition block 214 terminates the processing after returning the list to the allocation processing block 213 (Step 2117).

According to the allocation processing block 213 and real region acquisition block 214 in the embodiment described so far, since real regions to be allocated are selected in such a manner that larger vacant regions and continuous vacant regions are prioritized, it is possible to prevent fragmentation of both allocated and vacant regions, the first one of the four problems which the present invention intend to solve can be solved. In addition, since when an vacant area to be allocated is cut out from a vacant region, B.A. is applied only if the remaining size becomes smaller than the maximum region size, space efficiency can be raised, which solves the second problem. Further, when a vacant region is selected for allocation from a continuous vacant region set, the vacant region adjoining an allocated region which is less likely to be released is selected. This raises the possibility that the remaining vacant area will enlarge and therefore solves the third problem. Still further, since each virtual volume 100 can be divided into load-distributable divisions according to the number of divisions 312, the load on the virtual volume 100 can be distributed, which can solve the fourth problem. Especially in the first embodiment, since the largest area which has integer times the maximum region size 225 and is not larger than the allocation size is acquired from the vacant region selected in Step 2110, the remaining vacant area may become smaller than the maximum region size 225. This improves the space efficiency, contributing to solving the second problem.

Figure 6:
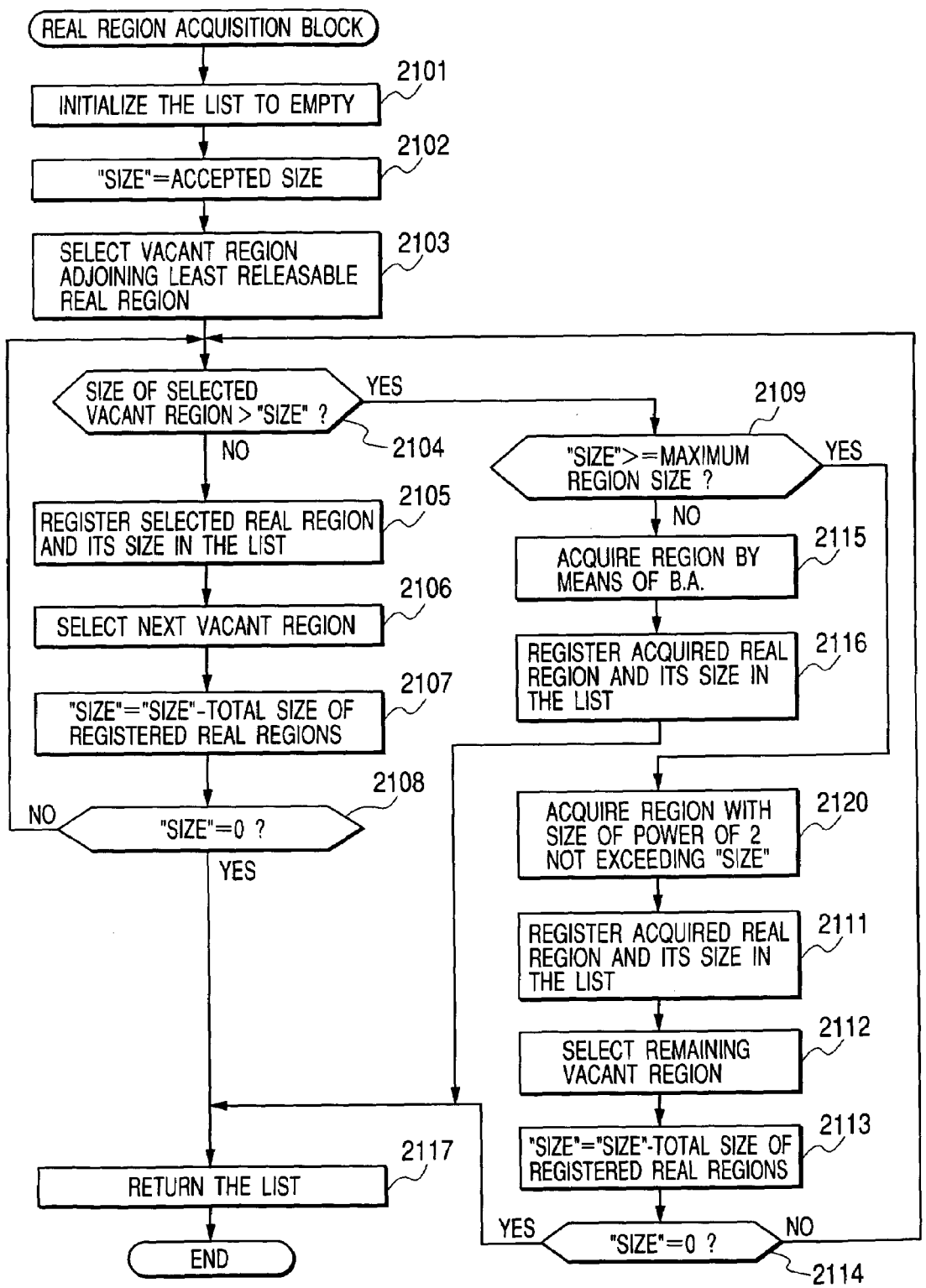
FIG. 6 is a flowchart illustrating the flows of processing by a real region acquisition block 214 in a second embodiment.

FIG. 6 is a flowchart illustrating the flows of processing by the real region acquisition block 214 in a second embodiment. Instead of Step 2110 of the real region acquisition block 214 in the first embodiment, the second embodiment executes Step 2120. In Step 2120, the real region acquisition block 214 cuts out a real region 132 which has the largest size of a power of two not exceeding "size".

According to the second embodiment, since a real region to be allocated to a virtual volume 100 is divided into a plurality of real regions 132, the size of each of which is a power of two exceeding the maximum region size 225, it seems that fragmentation of allocated regions may occur. However, since the vacant region adjoining the last acquired real region 132 is always selected in Step 2112, the plurality of regions acquired forms a continuous area without causing fragmentation. It is understood that also in the second embodiment, the four problems which the present invention intend to solve are solved as mentioned earlier.

After the processing by the allocation processing block 213 is complete, the virtual volume definition block 211 displays contents of the newly prepared or updated virtual volume management table 221 on the management console 114. The system administrator checks the displayed contents. If modification is entered via the management console 114, the virtual volume definition block 211 modifies the pertinent virtual volume management table 221 regarding the allocation of real regions according to the entered information.

After the above-mentioned check and modification are complete, the virtual volume definition block 211 sorts the real region IDs 317 in the list of temporally allocated real regions 316 in the address order of the real regions 132 and moves the sorted real region IDs 317 to the end of the list of allocated real regions 315. Finally, the pertinent access translation table 224 is created or updated so as to reflect the created or updated virtual volume 100.

Sorting the real region IDs 317 in the list of temporally allocated real regions 316 is performed in order to make the real regions 132, which are allocated to the virtual volume 100, as consecutive as possible in conjunction with the processing of the allocation processing block 213. If real regions 132 are made consecutive by this sorting, it is possible to decrease the number of sets each indicating an address range on the virtual volume 100 and the associated real address range in the storage device 13 and, therefore, reduce the size of the access translation table 224. That is, this can contribute to solving the first problem which the present invention intends to solve.

Figure 7A:
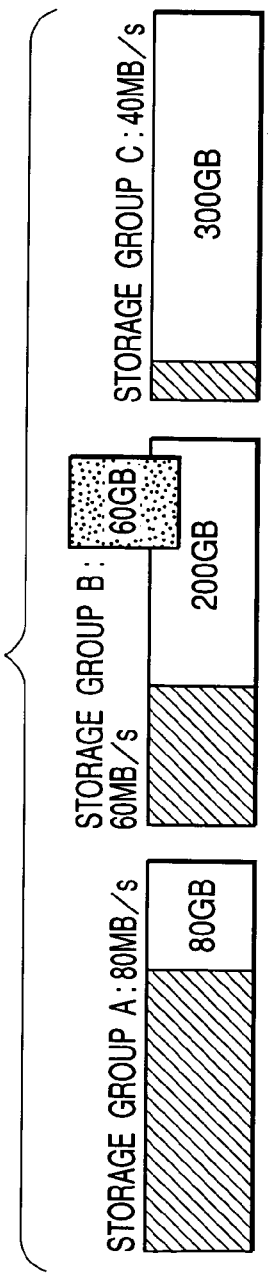
FIGS. 7(a), 7(b) and 7(c) are diagrams for explaining the principle of allocating a real region in the embodiments.

FIG. 7 is provided for explaining the principle of allocating a real region to a virtual volume in these embodiments. In FIG. 7(a), there are storage groups A, B and C which are respectively 80 MB/s, 60 MB/s and 40 MB/s in transfer performance. It is also assumed that they have vacant capacities of 80 GB, 200 GB and 300 GB respectively. The allocation processing block 213 selects a storage group which has the largest vacant capacity and satisfies the required performance. For example, if a 60 GB region is requested which has a transfer rate of 50 MB/s or more, the allocation processing block 213 selects the storage group B. In addition, the allocation processing block 213 selects a continuous vacant region of as large a size as possible from the vacant capacity of the storage group B. This makes it possible to prevent fragmentation of the storage area.

Figure 7B:
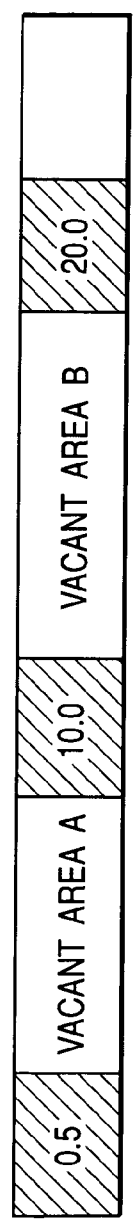

In FIG. 7(b), there is a continuous area set on a storage group. A vacant area A exists between an allocated region with a releasability of 0.5 and an allocated region with a releasability of 10.0 while a vacant area B exists between the allocated region with a releasability of 10.0 and an allocated region with a releasability of 20.0. The allocation processing block 213 selects the area A adjoining the region which is least likely to be released. In addition, the real region acquisition block 214 cuts out a real region for allocation in such a manner the acquired region adjoins the region which is least likely to be released. This is because since the possibility that the allocated regions with releasabilities of 10.0 and 20.0 respectively will be released is higher, the possibility that they will enlarge the respective continuous vacant areas is higher.

Figure 7C:
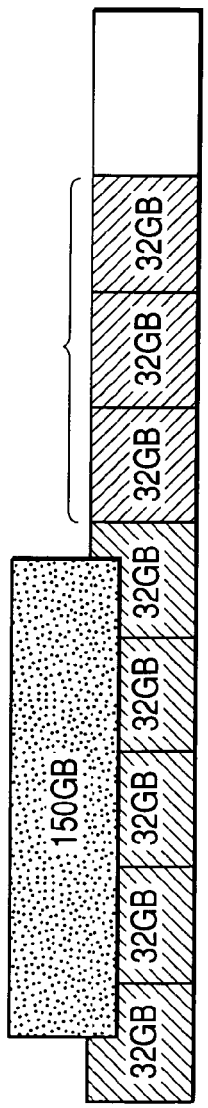

FIG. 7(c) is a diagram for explaining the effect of the first embodiment. A real region of 150 GB is to be allocated from a continuous vacant area of 256 GB or larger. Assume that the maximum region size 225 is 32 GB. If the conventional method is used, the smallest power of two exceeding 150 GB, that is, 256 GB, is allocated. According to the real region acquisition block 214 in the first embodiment, only a 160 GB real region is allocated since the size of the allocated region is integer times the maximum region size 225. Therefore, the useless allocation is avoided by 32 GB×3=96 GB as compared with the conventional method. In more detail, a 32 GB×4 region, not exceeding 150 GB, is allocated in the first allocation. In the second allocation, a 32 GB region is allocated by applying the B.A. to the remaining 22 GB. As a result, a real region of 32 GB×5=160 GB is allocated. In addition, the 160 GB real region is selected so as to adjoin an allocated region which is less likely to be released. Therefore, the 160 GB region starts at the left or right end of the vacant area in this figure. It is also understood that the wastefully allocated size is always smaller than the maximum region size 225 in the first embodiment.

The second embodiment is different from the first embodiment only in the method of allocation in the case shown in FIG. 7(c). In the second embodiment, the largest size of power of two not exceeding 150 GB, that is, a 32 GB×4 region, is allocated in the first allocation. In the second allocation, a 32 GB region is allocated by applying the B.A. to the remaining 22 GB. As a result, a real region of 32 GB ×5=160 GB is allocated, providing the effect as in the first embodiment. It is understood that also in the second embodiment, the wastefully allocated size is always smaller than the maximum region size 225.

Using FIG. 8, the following describes a third embodiment of the present invention. FIG. 8 shows the system configuration of the third embodiment. The configuration of FIG. 8 is different from that of FIG. 1 in that a virtualization switch 11 is incorporated in a storage device 813. That is, the virtualization switch 11 and the storage device 813 are contained in the same cabinet. The storage device 813 allows its own LUs to be accessed as virtual volumes 100 by host processors 12. In addition, the virtualization switch 11 in the storage device 813 can be connected to another storage device 13. Description of the virtualization switch 11 is omitted here since it has the same functions as in the first or second embodiment mentioned above. According to the third embodiment, the storage device 813 having a virtualization function and virtual volume allocation function can solve the problems which the present invention intends to solve, similar to the first and second embodiments.

Figure 9:
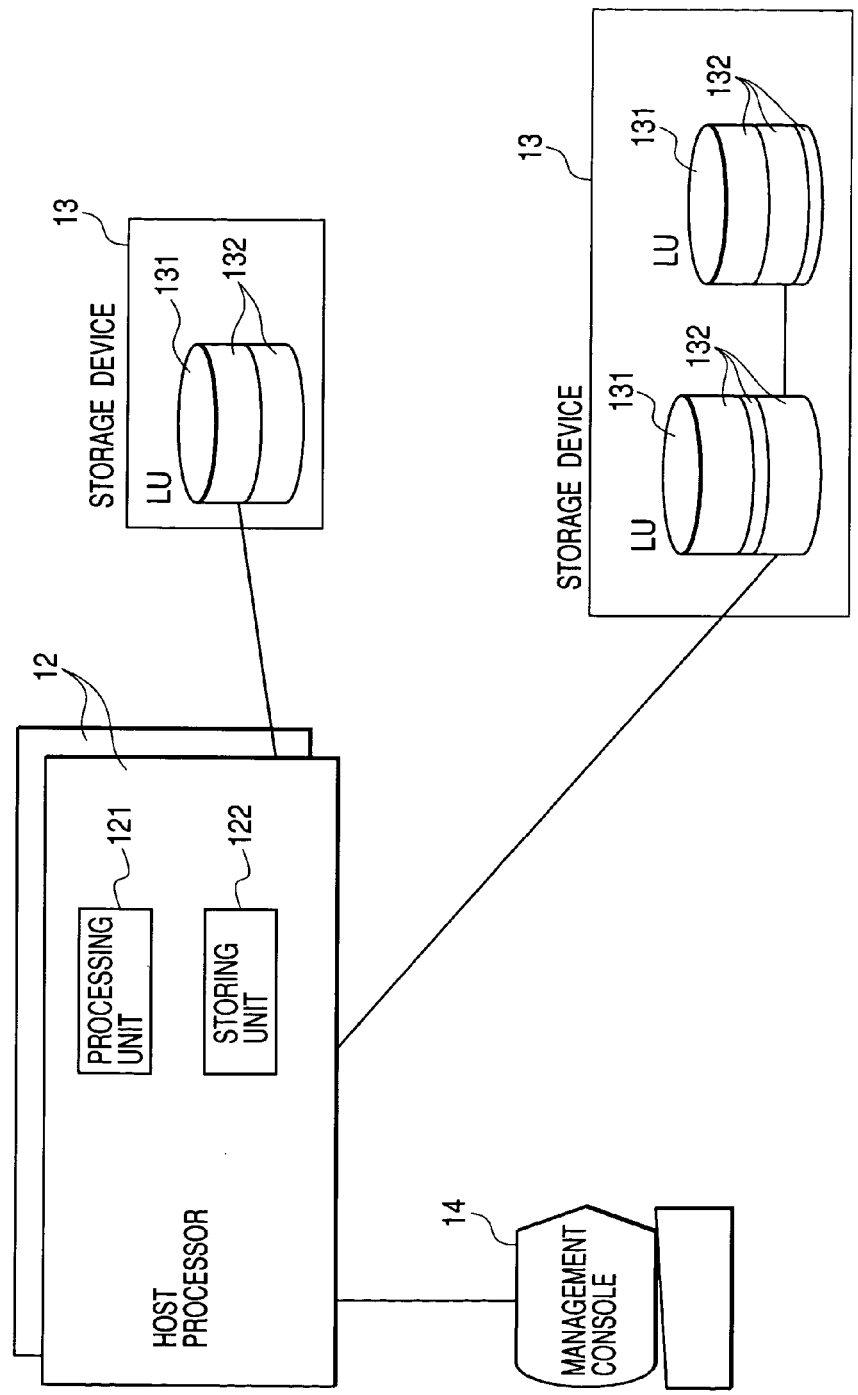
FIG. 9 is a diagram showing the system configuration of a fourth embodiment.
Figure 10:
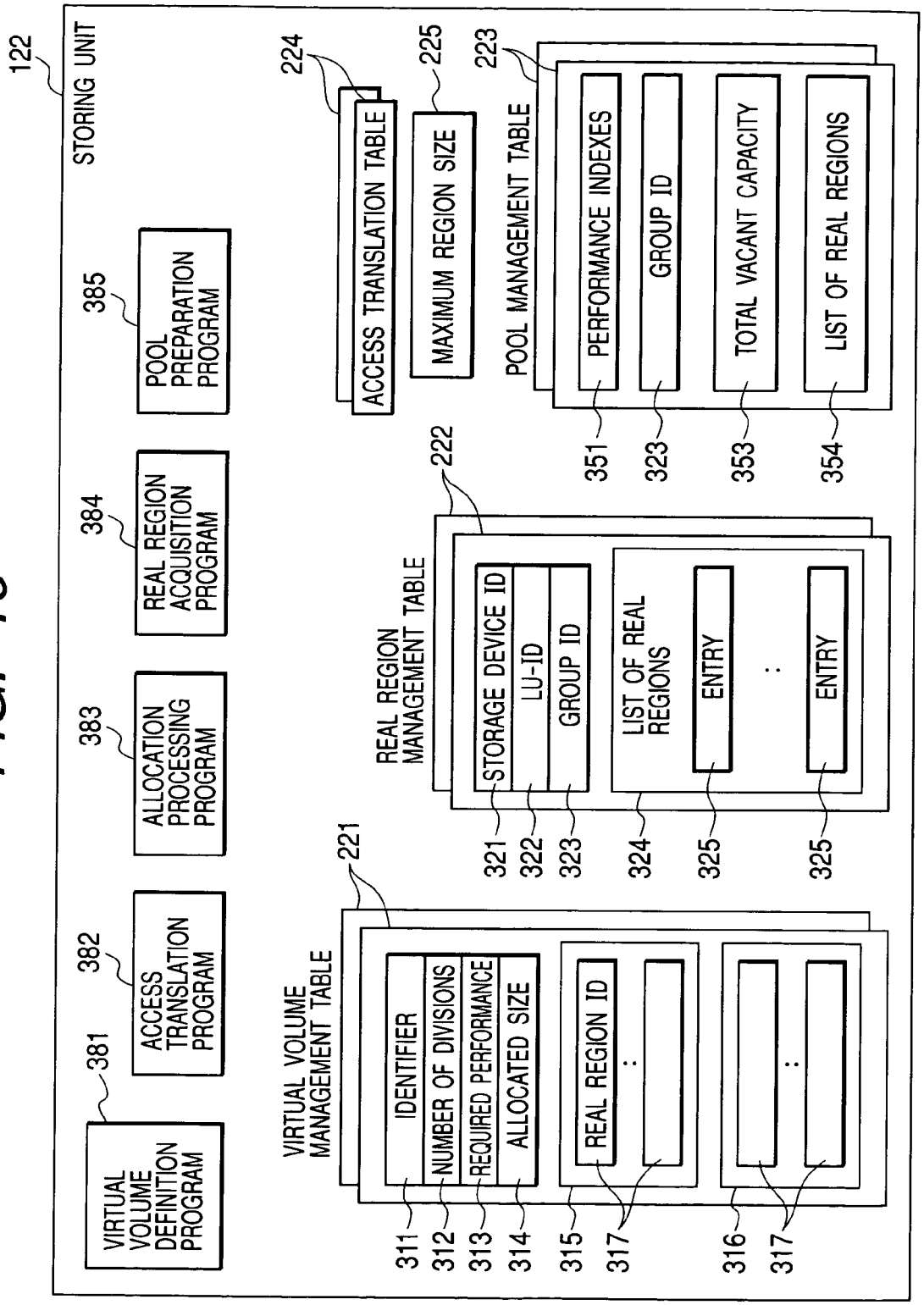
FIG. 10 is a diagram showing the internal configuration of a storing unit 122 in the fourth embodiment.

By using FIG. 9 and FIG. 10, the following describes a fourth embodiment of the present invention. FIG. 9 shows the system configuration of the fourth embodiment. In this embodiment, storage devices 13 and a management console 14 are connected with host processors 12. The configuration of FIG. 9 is different from that of FIG. 1 in that a processing unit 121 and a storing unit 122 are incorporated in each host processor 12 as indicated clearly. The processing unit 121 and storing unit 122 implement the functions of the virtualization switch 11 by executing the pertinent programs.

FIG. 10 shows the program and data configuration in the storing unit 122 in the fourth embodiment. Unlike the storing unit 220 of FIG. 3, the storing unit 122 of FIG. 10 stores a virtual volume definition program 381, an access translation program 382, an allocation processing program 383, a real region acquisition program 384 and a pool preparation program 385. The access translation program 382 is loaded to the storing unit 122 by the processing unit 121 for execution. Each input/output request for a virtual volume 100, which is issued by a running application program or file system control program (not shown in the figure), is translated by the access translation program 382 to an input/output request for a LU 131 in a storage device 13.

The virtual volume definition program 381, allocation processing program 383, real region acquisition program 384 and pool preparation program 385 are also loaded to the storing unit 122 by the processing unit 121 for execution. They implement the respective functions of the virtual volume definition block 211, allocation processing block 213, real region acquisition block 214 and pool preparation block 215 shown in FIG. 3. Description of the other configurations and functions is omitted here since they are similar to those in the first or second embodiment. According to the fourth embodiment, it is possible to virtualize the storage devices 13 and allocate them to virtual volumes by executing the aforementioned programs in the host processor 12 and therefore solve the problems which the present invention intends to solve similar to the first and second embodiments.

As mentioned so far, according to the present invention, it is possible to prevent fragmentation of storage regions. In addition, it is possible to enhance the usability of storage regions. Further, it is possible to enlarge the sizes of continuous vacant regions. Still further, load-dispersed allocation of storage regions is made possible.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A storage allocation method for allocating a vacant storage region to a virtual volume from storage regions of at least one of storage devices when storage regions maintained by the storage devices are provided as virtualized volumes to a host computer, said method comprising:
a first step of allocating a storage region for a required size to be allocated from said vacant storage region so that a remaining unallocated part of the required size to be allocated becomes smaller than a specified maximum region size of the vacant storage region; and a second step of, when said remaining unallocated part of said required size to be allocated becomes smaller than said specified maximum region size of the vacant storage region, acquiring a storage region having a size that is a smallest increment of the power of two that is not smaller than said remaining unallocated part of the required size from said vacant storage region for allocation; and a third step of, sorting the vacant storage region into a plurality of groups and dividing the virtual volume into a plurality of divisions for load dispersion among the plurality of divisions and dividing the required size to be allocated according to a specified number of divisions and assigning the divided required size to be allocated respectively to the plurality of groups for allocation.

2. A storage allocation method according to claim 1, further comprising a fourth step of, if said vacant storage region includes a plurality of continuous vacant regions, selecting a largest continuous vacant region for allocation.

3. A storage allocation method according to claim 1, further comprising a fourth step of, if said vacant storage region adjoins an allocated storage region on each side thereof, acquiring for allocation a storage region adjoining the allocated storage region which is less likely to be released.

4. A storage allocation method according to claim 1 wherein in said third step, if the number of said groups is greater than said number of divisions, the divided required size to be allocated are respectively assigned to the selected groups in decreasing order of the total vacant capacity for allocation.

5. A storage allocation method according to claim 1 wherein the first step further allocating a largest region whose size is an integer times said specified maximum region size and not exceeding said required size to be allocated from said vacant storage region.

6. A storage allocation method according to claim 1 wherein the first step further allocating a largest region whose size is a power of two not exceeding said required size to be allocated from said vacant storage region.

7. A virtualization device which provides storage regions maintained by at least one storage device to a host computer as virtualized volumes, said virtualization device comprising:
access translation table means for storing information on associativity between an address of each storage region on a virtual volume and the addresses of a corresponding logical unit in the storage device and a corresponding storage region in said logical unit;
means for translating an input/output request for said virtual volume into an input/output request for the storage region of said storage device with reference to said access translation table means;
means for accepting a request to allocate a vacant storage region to said virtual volume from storage regions of said storage device;
means for allocating a storage region for a required size to be allocated from said vacant storage region so that remaining unallocated part of the required size to be allocated becomes smaller than a specified maximum region size of the vacant storage region;
means for acquiring a storage region, having a size that is a smallest increment of the power of two that is not smaller than said remaining unallocated part of the required size to be allocated, from said vacant storage region for allocation when said remaining unallocated part of the required size becomes smaller than said specified maximum region size of the vacant storage region;

means for sorting the vacant storage region into a plurality of groups and dividing the required size to be allocated according to a specified number of divisions and assigning the divided required size to be allocated respectively to the plurality of groups for allocation; and means for, after storage allocation is completed for the request to allocate said vacant storage region, updating a content of said access translation table means based on an allocation result.

8. A virtualization device according to claim 7, further comprising means for, if said vacant storage region includes a plurality of continuous vacant regions, selecting a largest continuous vacant region for allocation.

9. A virtualization device according to claim 7, further comprising means for, if said vacant storage region adjoins an allocated storage region on each side thereof, acquiring for allocation a storage region adjoining the allocated storage region which is less likely to be released.

10. A virtualization device according to claim 7, further comprising means for, if the number of said groups is greater than said number of divisions, the divided required size to be allocated are respectively assigned to the selected groups in decreasing order of the total vacant capacity for allocation.

11. A storage device incorporating the virtualization device according to claim 7.

12. A computer readable storage medium storing a program executing a method on a computer to implement a method of providing storage regions maintained by storage devices as virtualized volumes to the computer and a method of allocating a vacant storage region to a virtual volume from storage regions of at least one storage device, said method of allocating vacant storage comprising the steps of:

allocating a storage region for a required size to be allocated from said vacant storage region so that a remaining unallocated part of the required size to be allocated becomes smaller than a specified maximum region size of the vacant storage region;

when said remaining unallocated part of the required size to be allocated becomes smaller than said specified maximum region size of the vacant storage region, acquiring a storage region having a size that is a smallest increment of the power of two that is not smaller than said remaining unallocated part of the required size to be allocated from said vacant storage region for allocation; and sorting the vacant storage region into a plurality of groups and divide the virtual volume into a plurality of divisions for load dispersion among the plurality of divisions and dividing the required size to be allocated according to a specified number of divisions and assign the divided required size to be allocated respectively to the plurality of groups for allocation.

13. The program according to claim 12, further selecting a largest continuous vacant region for allocation if said vacant storage region includes a plurality of continuous vacant regions.

14. The program according to claim 12, further acquiring for allocation a storage region adjoining the allocated storage region which is less likely to be released if said vacant storage region adjoins an allocated storage region on each side thereof.

15. The program according to claim 12, further assigning the divided required size to be allocated respectively to a group in the plurality of groups in decreasing order of the total vacant capacity for allocation if the number of said plurality of groups is larger than number of said plurality of divisions.

16. A system comprising:

at least one storage device maintaining a real storage region;

at least one host processor which initiates data read and write from and to said real storage region of said storage device;

a virtualization device which interferes between said host processor and said storage device and provides virtual volumes to said host processor; and a management console which issues a request said virtualization device to allocate a storage region for a virtual volume;

wherein said virtualization device comprises:

access translation table means for storing information on associativity between an address of each storage region on the virtual volume and the addresses of a corresponding logical unit in the storage device and a corresponding storage region in said logical unit;

means for translating an input/output request for said virtual volume into an input/output request for the storage region of said storage device with reference to said access translation table means;

means for accepting from said management console a request to allocate a vacant storage region to said virtual volume from storage regions of said storage device;

means for allocating a storage region for a required size to be allocated from said vacant storage region so that a remaining unallocated part of the required size to be allocated becomes smaller than a specified maximum region size of the unallocated storage region;

means for acquiring a storage region having a size that is a smallest increment of the power of two that is not smaller than said remaining unallocated part of the required size to be allocated from said vacant storage region for allocation when said remaining unallocated part of the required size becomes smaller than said specified maximum region size of the vacant storage region;

means for sorting the vacant storage region into a plurality of groups and dividing the required size to be allocated according to a specified number of divisions and assigning the divided required size to be allocated respectively to the plurality of groups for allocation; and means for updating a content of said access translation table means based on an allocation result after storage allocation is completed for the allocation request.

* * * * *